United States Patent
Santeler et al.

(10) Patent No.: US 7,409,581 B2
(45) Date of Patent: *Aug. 5, 2008

(54) MAIN MEMORY CONTROLLER ADAPTED TO CORRECT CORRUPTED DATA BY XORING CORRUPTED DATA TO DIRECTLY GENERATE CORRECT DATA

(75) Inventors: Paul A. Santeler, Cypress, TX (US); Kenneth A. Jansen, Spring, TX (US); Sompong P. Olarig, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 534 days.

This patent is subject to a terminal disclaimer.

(21) Appl. No.: 10/212,603

(22) Filed: Aug. 5, 2002

(65) Prior Publication Data

US 2002/0194530 A1   Dec. 19, 2002

Related U.S. Application Data

(63) Continuation of application No. 09/713,738, filed on Nov. 15, 2000, now Pat. No. 6,430,702, which is a continuation of application No. 08/940,282, filed on Sep. 30, 1997, now Pat. No. 6,223,301.

(51) Int. Cl.
*G06F 11/00* (2006.01)
(52) U.S. Cl. .................... 714/6; 714/5; 714/7; 714/767
(58) Field of Classification Search .................... 714/5, 714/6, 7, 773, 767; 711/114, 115
See application file for complete search history.

(56) References Cited

U.S. PATENT DOCUMENTS

| | | | | |
|---|---|---|---|---|
| 4,317,201 A | * | 2/1982 | Sedalis | 714/766 |
| 4,862,463 A | * | 8/1989 | Chen | 714/767 |
| 5,164,944 A | * | 11/1992 | Benton et al. | 714/765 |
| 5,206,865 A | * | 4/1993 | Gruender et al. | 714/767 |
| 5,210,860 A | | 5/1993 | Pfeffer et al. | 395/575 |
| 5,235,687 A | * | 8/1993 | Bacot et al. | 711/165 |
| 5,313,626 A | | 5/1994 | Jones et al. | 395/575 |
| 5,321,697 A | * | 6/1994 | Fromm et al. | 714/7 |
| 5,331,646 A | | 7/1994 | Krueger et al. | 371/40.1 |
| 5,367,669 A | * | 11/1994 | Holland et al. | 714/7 |
| 5,369,650 A | * | 11/1994 | Kirk et al. | 714/765 |
| 5,412,668 A | * | 5/1995 | Dewey | 714/766 |
| 5,426,744 A | | 6/1995 | Sawase et al. | 395/375 |
| 5,462,456 A | * | 10/1995 | Howell | 439/733.1 |
| 5,490,155 A | * | 2/1996 | Abdoo et al. | 714/763 |
| 5,493,574 A | * | 2/1996 | McKinley | 714/773 |

(Continued)

OTHER PUBLICATIONS

Crisp, "High Bandwidth RDRAM Technology Reduces System Cost", IEEE, 1996.*

(Continued)

*Primary Examiner*—Gabriel L Chu (57) ABSTRACT

A computer system includes memory modules, a central processing unit and a memory controller. The memory controller is configured to access the memory modules in response to interaction with the central processing unit and define a fault tolerant memory array with the memory modules. Each memory module stores first data represented by second data stored by the other memory modules.

36 Claims, 4 Drawing Sheets

U.S. PATENT DOCUMENTS

| | | | | |
|---|---|---|---|---|
| 5,504,859 | A | | 4/1996 | Gustafson et al. ...... 395/182.09 |
| 5,566,297 | A | | 10/1996 | Devarakonda et al. . 395/182.13 |
| 5,588,112 | A | | 12/1996 | Dearth et al. .......... 395/182.07 |
| 5,590,370 | A | * | 12/1996 | Asthana et al. ................ 712/14 |
| 5,611,042 | A | * | 3/1997 | Lordi ............................. 714/6 |
| 5,617,425 | A | | 4/1997 | Anderson .................. 371/10.2 |
| 5,619,642 | A | * | 4/1997 | Nielson et al. .................. 714/6 |
| 5,651,129 | A | | 7/1997 | Yokote et al. ............... 395/431 |
| 5,691,945 | A | | 11/1997 | Liou et al. .................. 365/280 |
| 5,724,295 | A | | 3/1998 | Beiley et al. ................ 365/222 |
| 5,734,814 | A | * | 3/1998 | Corbin et al. .................. 714/6 |
| 5,761,221 | A | * | 6/1998 | Baat et al. .................. 714/767 |
| 5,778,411 | A | * | 7/1998 | DeMoss et al. ................ 711/4 |
| 5,787,464 | A | * | 7/1998 | Yoshizawa et al. .......... 711/115 |
| 5,831,913 | A | | 11/1998 | Kirihata ...................... 365/200 |
| 5,905,854 | A | * | 5/1999 | Nielson et al. .................. 714/6 |
| 5,925,119 | A | * | 7/1999 | Maroney .................... 710/315 |
| 6,038,680 | A | * | 3/2000 | Olarig ............................ 714/6 |
| 6,041,430 | A | | 3/2000 | Yamauchi .................... 714/752 |
| 6,088,330 | A | * | 7/2000 | Bruck et al. ................ 370/228 |
| 6,289,471 | B1 | * | 9/2001 | Gordon ........................... 714/6 |
| 6,546,499 | B1 | * | 4/2003 | Challener et al. .............. 714/6 |
| 2005/0055501 | A1 | * | 3/2005 | Guha et al. .................. 711/112 |

OTHER PUBLICATIONS

Microsoft Press Computer Dictionary Third Edition, "main memory", Microsoft Press, 1997, p. 297.*

Microsoft Press Computer Dictionary Third Edition, "primary storage", Microsoft Press, 1997, p. 378.*

\* cited by examiner

MAIN MEMORY CONTROLLER ADAPTED TO CORRECT CORRUPTED DATA BY XORING CORRUPTED DATA TO DIRECTLY GENERATE CORRECT DATA

CROSS-REFERENCE TO RELATED APPLICATIONS

This application is a continuation of application Ser. No. 09/713,738 filed on Nov. 15, 2000 now U.S. Pat. No. 6,430,702, which is a continuation of application Ser. No. 08/940,282 filed on Sep. 30, 1997, now U.S. Pat. No. 6,223,301.

BACKGROUND

The invention relates to a fault tolerant memory.

Figure 1:
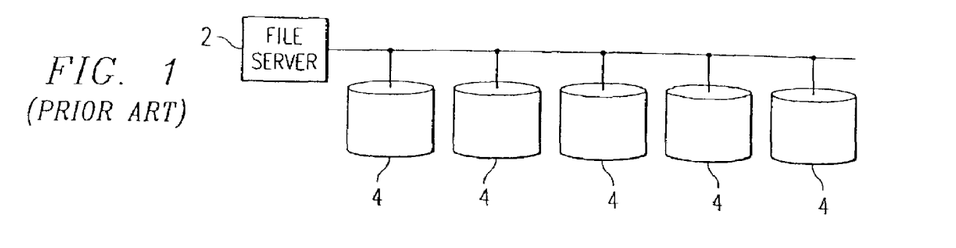
FIG. 1 is a schematic diagram of a computer system.

Referring to FIG. 1, to service its storage needs, a file server 2 typically requires several (e.g., 5) disk drives 4. To improve the rate at which a file server 2 stores and retrieves data from disk drives 4, quite often, the drives 4 are arranged in a data storage array so that chunks of the data are spread across all of the drives 4. Thus, when organized as an array, the drives 4 effectively become one logical disk drive. In this manner, all reads and writes of data simultaneously use all of the drives 4. As a result, data transfer time between the server 2 and the disk drives 4 is reduced.

Unfortunately, the additional performance gained from the array of drives 4 does not come without a cost. Each additional drive added to the server 2 increases the likelihood that one of the drives 4 will fail and data will be lost. To improve the data storage integrity of the drives 4, data is quite often stored on the drives 4 in a fault tolerant scheme so that data from a failed drive can be recovered by using data from the others drives of the array.

Several common fault tolerant schemes that are used with drive arrays fall into a general drive array organizational scheme known as a Redundant Array of Inexpensive Disks (RAID). A particular drive array might be organized under one of several RAID types, or RAID levels. In a level one RAID array, data is mirrored, or shadowed, in redundant drives. Thus, for example, to store data in the array, the data is stored across two of the drives 4, and, simultaneously, a copy of this data is stored across two other drives 4 that serve as mirror drives. Thus, the data on the mirror drives duplicates the data on the main drives, and if one of the drives should fail, the data on the failed drive can be recovered from the duplicate drive.

A drive array may use a parity-based RAID scheme. In this scheme, the data is distributed in chunks across the array along with a parity chunk that is generated from the data. This parity chunk is used to recover data should a drive of the array fail.

Figure 2:
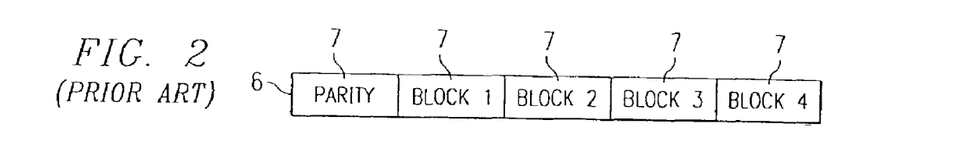
FIG. 2 is a schematic representation of a stripe of data.

For example, referring to FIG. 2, in a level four RAID array, data is distributed in a stripe 6 across the array. In this manner, each stripe 6 is subdivided into five chunks, or blocks 7, and each block 7 is stored on one or more drives 4 of the array. Thus, a level four RAID array requires at least five disk drives 4. One of the blocks 7 (e.g., block 7a) is a parity block. This parity block is essentially the additional, redundant data used as an aid in recovering data from a failed drive 4. In a level four RAID array, the parity block 7 is stored on one or more parity dedicated drives 4 of the array. In the most basic level four RAID scheme, each of the different blocks 7 is stored on one of five of the different drives 4.

The parity data stored in the parity block 7a is derived from the other blocks 7b, 7c, 7d and 7e. The parity block 7a typically is formed by includes performing an exclusive OR (XOR) of the blocks 7b, 7c, 7d and 7e. As a result of this scheme, if any one of the blocks 7a, 7b, 7c, 7d and 7e is lost due to a failed drive, the block may be recovered by XORing the remaining blocks together.

The server must update the parity block 7a each time the server 2 updates a block 7 of the stripe 6. However, the server 2 does not have to read all five blocks 7 (i.e., one stripe 6) from the array to recalculate the parity block 7a each time one of the blocks 7 is updated. Instead, to write one block to the array, the server 2 only needs to read the block 7 to be updated (i.e., the old data block) and read the parity block 7a (i.e., the old parity block). Due to the nature of the XOR arithmetic, the new parity block 7a is calculated by XORing the old parity block with both the old data block and the new block of data to be written to the array.

Other RAID levels are also commonly used. These levels include level five RAID which is similar to level four RAID, except that the parity blocks are distributed across all five drives, instead of just being located on one dedicated drive.

SUMMARY

In general, in one aspect, the invention features a computer system that includes memory units, a central processing unit and a memory controller. The memory controller is configured to access the memory units in response to interaction with the central processing unit and define a fault tolerant memory array with the memory units. Each memory unit stores first data represented by second data stored by the other memory units.

Advantages of the invention may include one or more of the following. Multiple memory failures are tolerated. Memory uncorrectable by ECC code can be corrected. System crashes are prevented. Memory modules may be "hot swapped."Memory down times are reduced. Memory may be expanded or reduced while the system remains powered up.

Implementations of the invention may include one or more of the following. The first data may include a mirror image of the second data. The fault tolerant array may include a RAID-type array. The controller may also be configured to use the second data to restore the first data. This restoration may include exclusive ORing the second data together. The first and second data may include a stripe of data that is stored in all of the memory units (e.g., memory modules such as DIMMs, SIMMs or RIMMs). The stripe may have contiguous blocks of data, and the first data may include a portion of one of the blocks.

In general, in another aspect, the invention features a computer system that includes a central processing unit, memory chips and a memory controller. The central processing unit is configured to generate data. The memory controller is configured to store the data in the memory chips, define a fault tolerant array with the memory chips, and use the fault tolerant array to restore the data.

Implementations of the invention may include one or more of the following. The memory controller may also be configured to generate correction code for correcting corruption in the data, store the correction code in the memory chips, use the correction code to correct corruption in the data when the corruption is correctable, and use the fault tolerant array to restore the data and corruption code when the corruption is not correctable.

In general, in another aspect, the invention features a computer system that includes a central processing unit, a slot connector and memory. The memory includes a first memory module that is inserted in the slot connector, and the first memory module stores data. The memory controller is configured to use the memory to restore the data on a second memory module that replaces the first memory module.

Implementations of the invention may include one or more of the following. The memory may include additional memory modules, and the memory controller may also be configured to define a fault tolerant array with the memory modules. The slot connector may include a hot plug slot connector.

In general, in another aspect, the invention features a method for use with a computer system that has memory units. The method includes defining a fault tolerant memory array with the memory units. Each memory unit stores first data represented by second data stored by the other memory units.

In general, in another aspect, the invention features a method for use with a computer system that has memory chips. The method includes storing data in the memory chips, defining a fault tolerant array with the memory chips, and using the fault tolerant array to restore the data.

In general, in another aspect, the invention features a method for use with a computer system that has memory. The memory includes a first memory module that is inserted in the slot connector. The first memory module stores data. The method includes using the memory to restore the data on a second memory module that replaces the first memory module.

Other advantages and features will become apparent from the following description and from the claims.

DESCRIPTION

Figure 3:
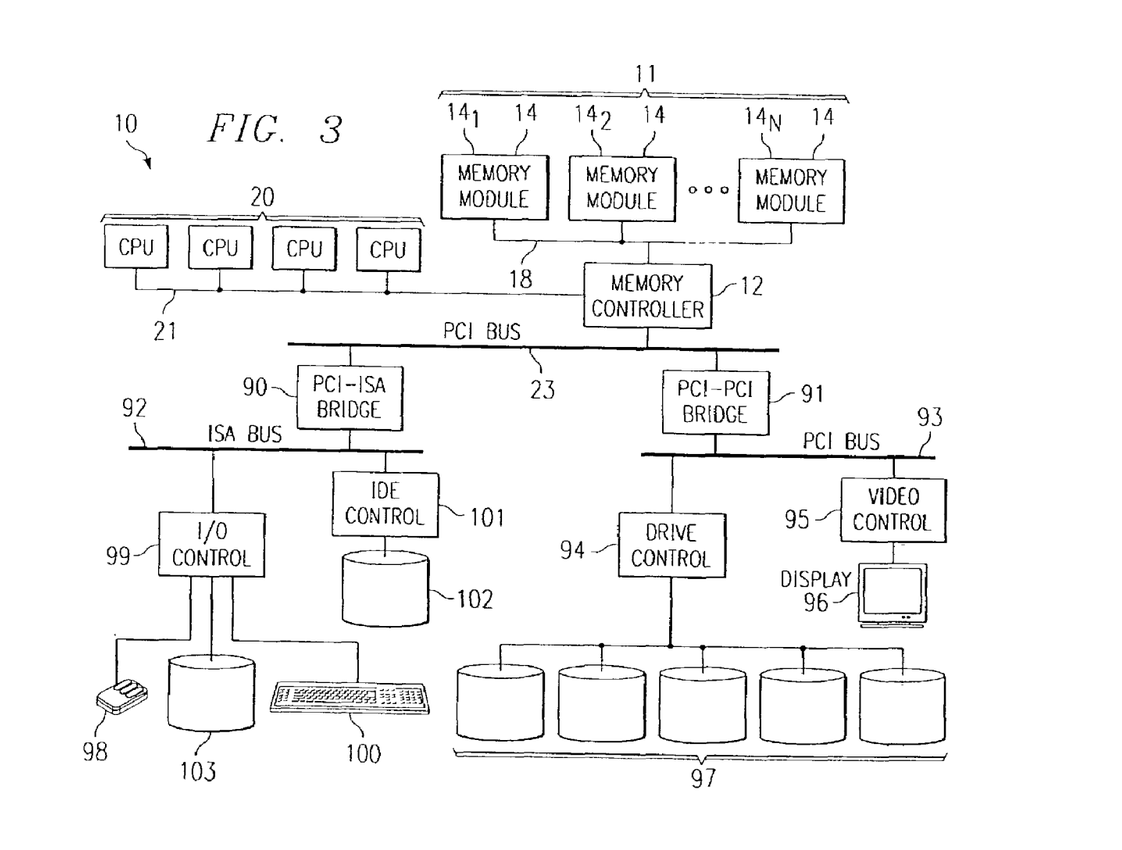
FIG. 3 is a schematic diagram of another computer system.

Referring to FIG. 3, a computer system 10 has memory modules 14 that form a system memory 11. Data is stored in and retrieved from the memory 11 by a memory controller 12 which directly accesses the memory 11 and serves as an interface between the rest of the system 10 and the system memory 11.

To store or retrieve data from the memory 11, the memory controller 12 is constructed to simultaneously access more than one removable, memory module 14 (e.g., memory modules $14_1, 14_2 \ldots 14_N$) of the memory 11. In this manner, the memory controller 12 is constructed to simultaneously distribute blocks, or chunks, of data across several of the memory modules 14. As a result of this arrangement, memory access times are minimized due to the parallel transfers of data to\from the memory modules 14. The memory modules 14 may be, for example, SIMMs or DIMMS.

Figure 3A:
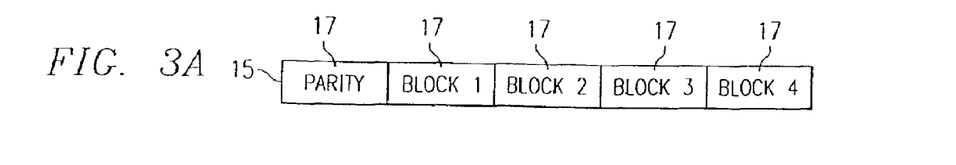
FIG. 3A is a schematic representation of a stripe of data.

To accomplish these features, the memory controller 12 divides the collective physical address space of the memory modules 14 into stripe regions for storing stripes of data 15 (see FIG. 3A). Each stripe 15 represents a contiguous (as seen by software) block of data that is transferred to/from several of the memory modules 14 in one operation. In this manner, each stripe region is mapped into the address spaces of several of the memory modules 14.

The memory controller 12 accesses several of the memory modules 14 at once. Thus, the bandwidth of data transfers to/from the memory 11 is equal to the combined bandwidths of the memory modules 14 that are accessed.

Although other stripe sizes are possible, in the arrangements discussed below, each stripe 15 is divided into five blocks 17 (Block0, Block1, Block2, Block3 and Block4) that have a uniform, predetermined size. The size of the blocks 17 may vary, for example, from thirty-two bytes to two kilobytes, depending on the application being executed by the computer system. The size is also dependent on a cacheline size, as discussed below.

Thus, the data striping reduces memory access times. However, the more memory modules, the more likely one of the memory modules will fail. To protect the data integrity of the memory 11, a redundant, fault tolerant scheme is used. In some arrangements, this fault tolerant scheme is a RAID scheme. For example, in one arrangement (see FIG. 4), the memory controller 12 uses a level one, or mirroring RAID scheme. In this scheme, the memory controller 12 converts divides the collective physical address space of the memory 11 into a data memory bank 30a and a redundant, logical mirror memory bank 30b.

Figure 4:
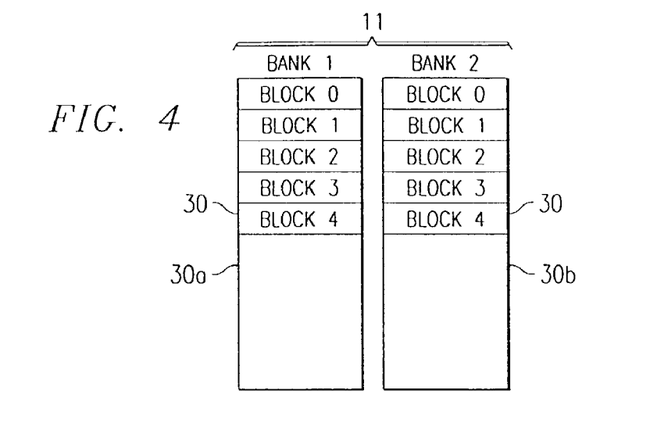
FIGS. 4, 5 and 6 are schematic representations of the storage of data in disk drives.

The memory controller 12 is constructed to store all data in the data memory bank 30a and simultaneously store a copy of this data in the mirror memory bank 30b. Each bank 30 includes the same number of multiple memory modules 14. For example, in some arrangements, each bank includes two memory modules 14.

Figure 5:
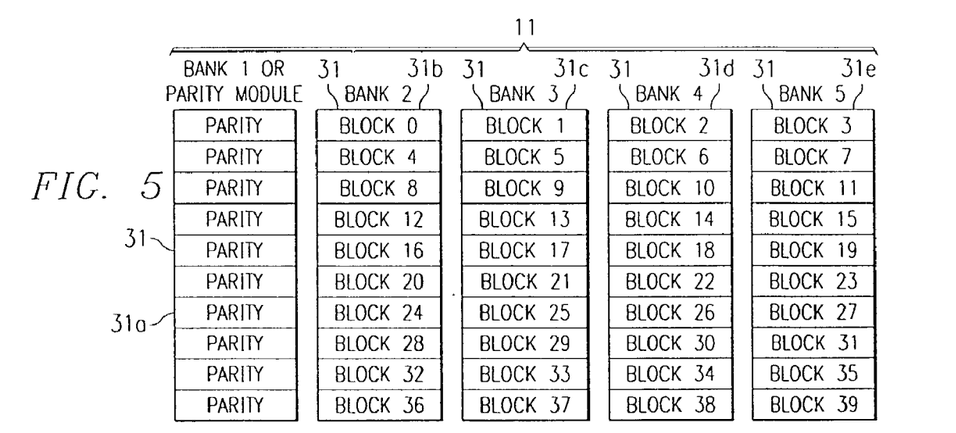

Referring to FIG. 5, in other arrangements, the memory controller 12 divides the collective physical address space of the memory 11 into five memory banks 31 (e.g., memory bank 31a, 31b, 31c, 31d and 31e) and implements a level four RAID scheme. In this scheme, each stripe 17 (e.g., Block0, Block1, Block2, Block 3 and Block 4 belong to one stripe and Block4, Block5, Block6 and Block7 belong to another stripe) is written across all five memory banks 31.

In the level four RAID scheme, one of the memory banks 31 (e.g., memory bank 31a) is dedicated to store all of the parity blocks of the stripes 15, and four of the memory banks 31 (e.g., memory banks 31b, 31c, 31d and 31e) are dedicated to store the data blocks of the stripes 15. Each bank 31 includes the same multiple number of memory modules 14. For example, in some arrangements, each bank 31 includes two memory modules 14.

Figure 6:
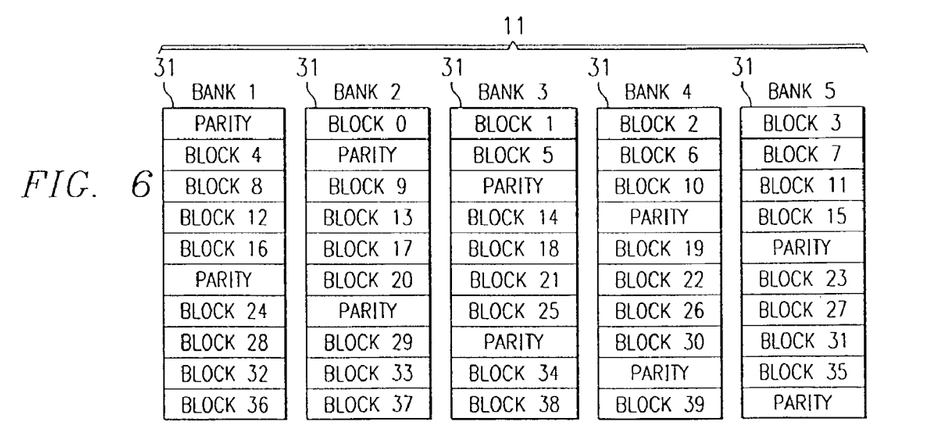

In another arrangement (see FIG. 6), the memory controller 12 implements a level five RAID scheme. The level five RAID scheme is similar to the level four RAID scheme except that instead of having dedicated banks for data blocks and parity blocks, the parity blocks are distributed across all five banks 31. To accomplish this, the parity block does not have a dedicated block position in the stripe, but instead, the position of the parity block is rotated from one stripe to the next.

The physical addressing performed by the memory controller 12 is transparent to devices of the computer system 10. Thus, the mapping of data into the striped regions in the memory 11 is performed by the memory controller 12. As a result, preexisting software of the system 10 does not need to be modified, as the memory 11 appears to be one logical unit.

Figure 7:
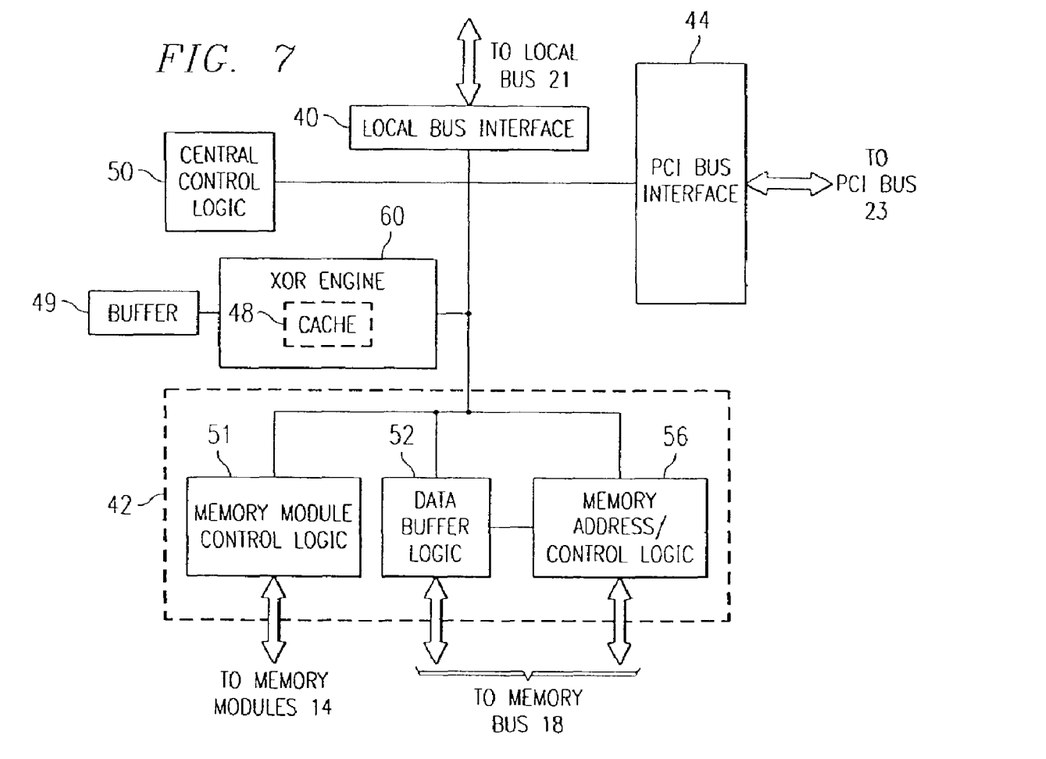
FIG. 7 is a schematic diagram of the memory controller of the computer system of FIG. 3.

Referring to FIG. 7, the memory controller 12 has a memory bus interface 42 that is constructed to encode and decode bus cycles on a memory bus 18 which extends to the memory modules 14. The memory bus 18 has a different set of data/error code correction (ECC) lines (e.g., sixty-four data lines and eight ECC lines) for each different memory bank.

Other lines of the memory bus 18 are unique to each memory bank. For example, a unique set of command, chip select, clock enable and clock lines are provided to each memory bank. In other arrangements, these lines are shared by all memory banks.

Memory module select lines (to activate a particular memory module) are used to select which memory modules are active. For example, the bank may have two memory modules, and only one memory module is active at a particular time.

The memory banks share other sets of common lines of the bus 18. For example, the memory banks share a common set of PAS# lines, CASE lines, address lines, bank select lines, and write enable lines.

The memory controller 12 has a local bus interface 40 that is constructed to encode and decode bus cycles on a local bus 21 and a Peripheral Component Interconnect (PCI) bus interface 44 that is constructed to encode and decode bus cycles on a PCI bus 23. Both the local bus interface 40 and the PCI bus interface 44 are coupled to each other and to the memory bus interface 42.

Central control logic 50 of the controller 12 uses the interfaces 40, 42 and 44 to transfer data between the local 21, PCI 23 and memory 18 buses. In this manner, the memory controller 12 serves also as a bridge between the local bus 21 and the PCI bus 23.

As discussed below, the memory bus interface 42 has data buffer logic 52 that uses error code correction (ECC) techniques to correct minor errors in data read from the memory modules 14. The data buffer logic 52 also generates ECC information which is stored along with all data stored in the memory modules 14. For sixty-four bits of data, the ECC code includes, for example, eight bits of ECC information.

When data is retrieved from the memory 11, the data buffer logic 52 analyzes the ECC information associated with that data to determine if the data is corrupted. If so, the data buffer logic 52 determines whether the data is correctable with the ECC information. If so, the data buffer logic 52 corrects the data.

In typical computer systems that use ECC memory, if the data is uncorrectable by using ECC code, a non-maskable interrupt (NMI) is generated which typically crashes the system. However, the system 10 has a fault tolerant memory 11 that corrects corrupted data that cannot be corrected by the ECC information. In this manner, if the data buffer logic 52 determines the data is not correctable with the ECC information, the logic 52 generates a maskable interrupt (i.e., not an NMI), and the redundant, fault tolerant scheme used by the memory subsystem 11 is used to restore the block 17 of data that contains the ECC uncorrectable data.

This restoration is performed by the memory controller 12, and is, in some arrangements, a background task. The memory controller 12 restores the data in the block 17 that is defective by XORing the other blocks of the same stripe together to generate a replacement block. The memory controller 12 completes the restoration by writing the replacement block to the memory 11.

The fault tolerant scheme may also be used by the memory controller 12 to restore data on an entire memory module 14. To accomplish this, the memory controller 12 restores each block 17 on the module 14 by XORing together blocks from the other memory modules 14. Thus, defective memory modules 14 can be "hot swapped" with replacement memory modules without turning off power to or crashing the system 10. The hot plugging of memory modules is further discussed in U.S. patent application Ser. No. 08/940,419, entitled, "Installation and Removal of Components of a Computer," filed on Sep. 30, 1997, and hereby incorporated by reference.

Via the data buffer logic 52, the memory controller 12 can write a full stripe (i.e., a stripe with all of the blocks) to the memory banks using parallel write operations on the memory bus 18. In this manner, the data buffer logic 52 computes the parity information of the stripe, and then, without needing to retrieve the old stripe data from the memory 11, the data buffer logic 52 writes the new, full stripe to the memory 11.

Unlike full stripe writes, partial stripe writes, i.e., stripes that require the memory controller 12 to write less than a full stripe (e.g., only two or three blocks of the stripe) to the memory 11, introduce more overhead. For example, without the features of the controller 12 discussed below, in order to write a partial stripe, the controller 12 would always generate four separate memory requests for each partial stripe write: one request to read the parity information, one request to read the old data stored in the memory, one request to write the new data and one request to write the new parity. Because the blocks are accessed in parallel, the above steps occur in two operations across the memory bus 18.

To reduce the number of required operations for partial stripe write operations, the data buffer logic 52 has a cache 48 which is configured to capture blocks of data and parity read from the stripe. Thus, the size of cachelines of the cache 48, in some arrangements, is equal to the block size of the stripe. If the old data for computing the parity of the stripe is already in the cache 48, then the number of required memory accesses is reduced from four to three. If the old parity is in the cache 48, then the number of required memory accesses can be reduced from three to two. Because the old data and the old parity are read in parallel, the partial stripe write consumes no more transfer time than a full stripe write.

To improve the data processing speed of the memory controller 12, the data buffer interface 52 also has a posted memory write (PMW) buffer 49. When a central processing unit (CPU) 20, for example, writes data to the memory 11, the CPU 20 waits for an acknowledgement from the memory controller 12. Because the write of data to the memory 11 may include at least two memory operations (i.e., require two clock cycles), the CPU 20 may be delayed in waiting for the acknowledgement. To prevent this from occurring, the controller 12 has a posted memory write (PMW) buffer 49 which acknowledges the completion of a write of the data to the memory modules 14 even though the write is still pending.

A potential problem with the PMW buffer 49 is that once the write is acknowledged, the requesting device assumes the data is stored in memory and does not to store the data again. Thus, if the computer system 10 is reset, the data in the PMW buffer 49 may be lost. To prevent this from occurring, the PMW buffer 49 may include non-volatile memory which is not subject to power loss, or reset.

Because the buffer 49 is several entries deep, the buffer 49, in some arrangements, is used to collect partial stripes and when, possible, assemble the partial stripes into full stripes. In some arrangements, the size of the buffer 49 is sufficient to hold a backlog of write requests. In this manner, some of the stripe reads/writes are performed as background tasks. In some arrangements, the buffer 49 is a first-in-first-out (FIFO) buffer.

Besides the data buffer logic 48, the memory controller 12 also has memory address/control logic 56 that performs mapping of the memory 11 into the stripes and generates control signals to access the memory chips of the subsystem 11.

The memory controller 12 has also an XOR engine 60 that is coupled between the buffer 49 and data buffer logic 52 and used to compute parity information for each stripe. The XOR engine 60 also controls the storage and retrieval of data from the buffer 49. As stripe write requests are moved through the buffer 49, the XOR engine 60 attempts to combine the requests to form full stripes. For full stripes, the XOR engine 60 XORs all blocks of the stripe to form the parity block. For partial stripes, the XOR engine 60 reads the old blocks of parity and data from the memory 11 and uses this to form the new parity block.

To enhance its performance, the XOR engine 60 has the cache 48 which the XOR engine 60 uses to trap old data reads and recently written parity.

Figure 8:
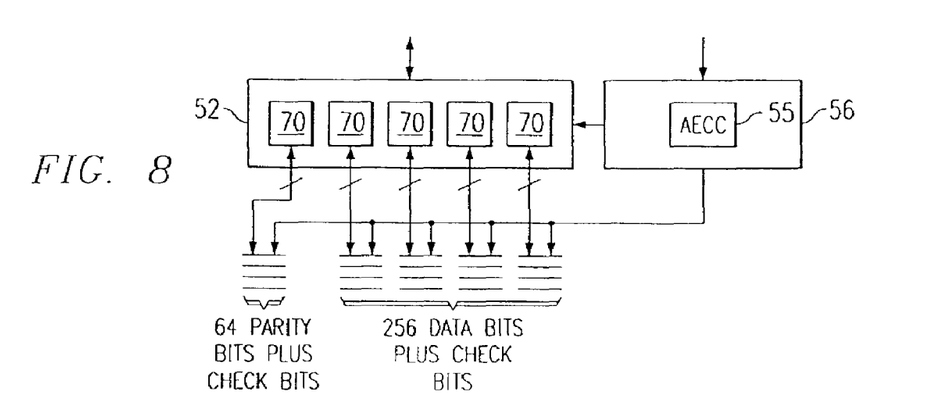
FIG. 8 is a schematic diagram of data buffer logic.

Referring to FIG. 8, the data buffer logic 52 has ECC units 70 (i.e., ECC units 70a, 70b, 70c and 70d). Each different ECC unit 70 handles the generation of ECC bits and the correction of data for a different memory bank. For the case of one memory module per memory bank, each ECC unit 70 processes sixty-four bits of data and the associated ECC code (e.g., eight bits of ECC code). Two hundred fifty-six bits are used for data bits and sixty-four bits are used for parity bits for the fault tolerant array.

Figure 9:
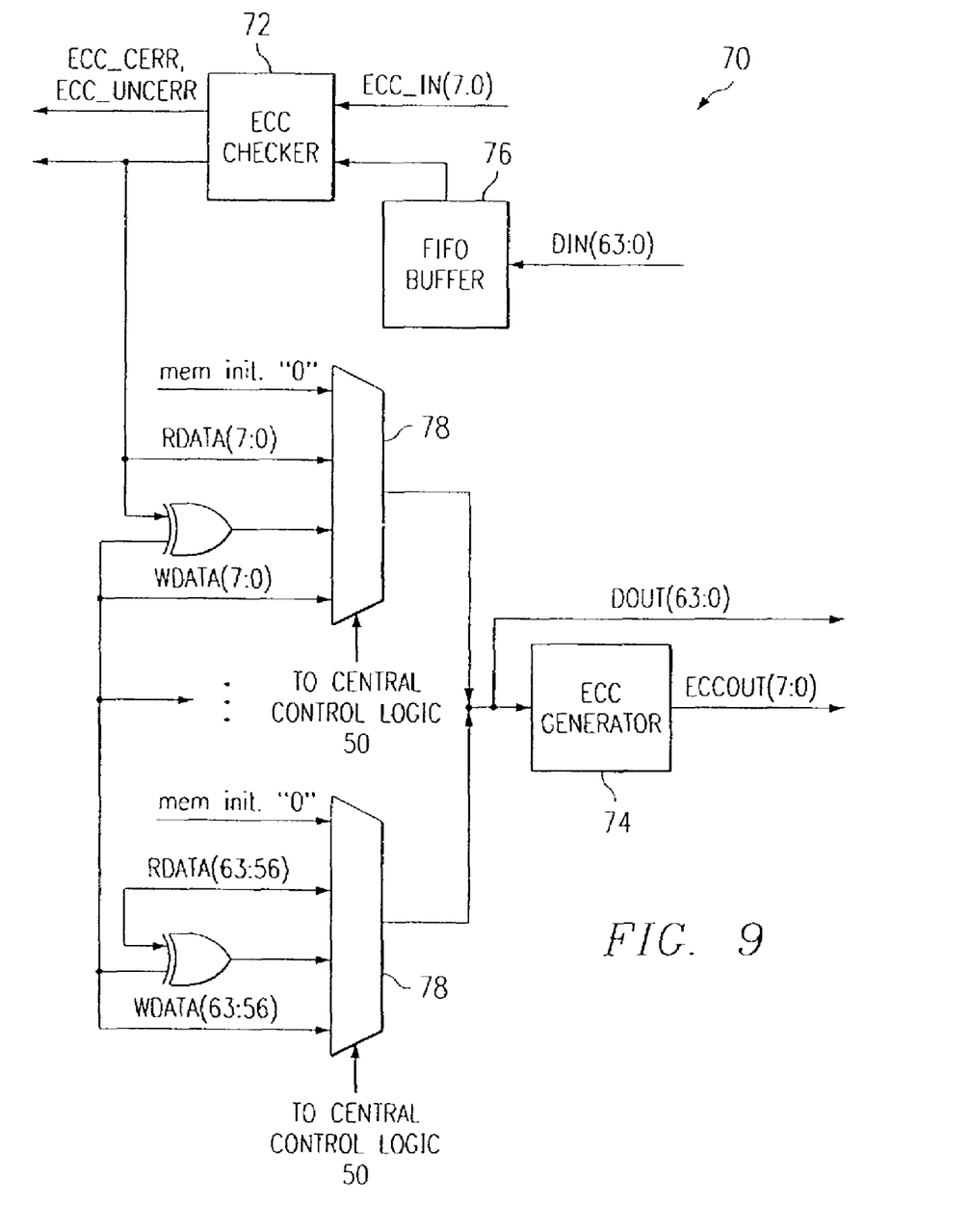
FIG. 9 is a schematic diagram of error code correction circuitry.

Referring to FIG. 9, each ECC unit 70 includes an ECC checker 72 that uses the ECC code to detect data corruption in the associated sixty-four bits of data and the ECC code. If the data/ECC code is correctable, the ECC unit 70 asserts a correctable error signal called ECC_CERR and corrects the corrupted data/ECC code. If the data/ECC code is uncorrectable, the ECC checker 72 asserts an uncorrectable error signal called ECC_UNCERR which causes the generation of a maskable interrupt (i.e., does not cause the generation of an NMI). A FIFO buffer 76 temporarily stores data as the data is read into the data buffer interface 52. Although the FIFO buffer 76 may have one of many different sizes, the size of the FIFO buffer 76, in some arrangements, is equal to the cacheline size of the CPU 20.

Each ECC unit 70 also includes an ECC generator 74 which generates an eight bit ECC code for each sixty-four bits written to the memory subsystem 11. The ECC unit 70 also has multiplexers 78 that are used to perform read-modify-write operations. This feature is used when less than all of the sixty-four bits are changed. Each multiplexer 78 is associated with a different byte of the sixty-four bits, or eight bytes. Thus, when a write needs to be performed to less than all eight bytes, all of the old eight bytes are first read from memory, the multiplexers 78 then select a combination of the new and old bytes to be written back to the memory.

Referring back to FIG. 3, the computer system 10 includes four central processing units (CPU)s that are connected to the local bus 21. The memory modules 14 are, in some arrangements, single in-line memory modules (SIMM)s, double in-line memory modules (DIMM)s and/or rambus in-line memory modules (RIMM)s, all of which contain memory chips mounted to a printed circuit board (PCB). A PCI-Industry Standard Architecture (PCI-ISA) bridge 90 interfaces the primary PCI bus 23 to an ISA bus 92, and a PCI-PCI bridge 91 interfaces the primary PCI bus 23 to a secondary PCI bus 93.

An input/output (I/O) controller 99 and an Intelligent Electronic Device (IDE) controller 101 are coupled to the ISA bus 92. The I/O controller 99 receives inputs from a mouse 98 and keyboard 100. The I/O controller 99 also controls operation of a floppy disk drive 103. The IDE controller 101 controls operation of a CD-ROM drive 102.

A disk drive controller 94 and a video controller 95 are coupled to the secondary PCI bus 93. The drive controller 94 controls operation of a disk array 97, and the video controller 95 drives a display 96.

Other embodiments are within the scope of the following claims. For example, the memory may be organized in other fault tolerant schemes, such as a level three or a level six RAID scheme.

What is claimed is:

1. A memory controller adapted to configure a semiconductor main memory as a fault tolerant memory array, the memory controller comprising:
   a memory bus interface adapted to be coupled to the semiconductor main memory for direct access to the semiconductor main memory;
   a local bus interface adapted to be coupled to a central processing unit;
   wherein the memory controller is adapted to utilize error correction code to detect corrupted data retrieved by the memory controller from the semiconductor main memory; and
   wherein the memory controller is further adapted to correct the corrupted data by XORing the corrupted data to directly generate correct data.

2. The memory controller, as set forth in claim 1, wherein the semiconductor main memory comprises a plurality of memory modules.

3. The memory controller, as set forth in claim 2, wherein the memory controller is adapted to configure the semiconductor main memory to stripe data across the plurality of memory modules such that each stripe comprises a plurality of blocks of data and at least one block of parity information, each of the plurality of blocks of data and the at least one block of parity information adapted to be stored in a respective one of the plurality of memory modules.

4. The memory controller, as set forth in claim 2, wherein the plurality of memory modules are removable.

5. The memory controller, as set forth in claim 1, wherein the XOR engine is adapted to retrieve a plurality of blocks of data and at least one block of parity information from the semiconductor main memory and to correct corrupted data in one of the plurality of blocks of data by XORing the other plurality of blocks of data and the at least one block of parity information.

6. The memory controller, as set forth in claim 1, wherein the XOR engine is adapted to restore the corrected data to the semiconductor main memory.

7. A memory system comprising:
   a semiconductor main memory;
   a memory controller adapted to be used as a bridge between at least one processor and the semiconductor main memory;
   wherein the memory controller is adapted to be operably coupled to the semiconductor main memory for direct access to the semiconductor main memory;
   wherein the memory controller is adapted to configure the semiconductor main memory as a fault tolerant memory array;
   wherein the memory controller is adapted to utilize error correction code to detect corrupted data retrieved by the memory controller from the semiconductor main memory; and
   wherein the memory controller is further adapted to correct the corrupted data by XORing the corrupted data to directly generate correct data.

8. The memory system, as set forth in claim 7, wherein the semiconductor main memory comprises a plurality of memory modules.

9. The memory system, as set forth in claim 8, wherein the memory controller is adapted to configure the semiconductor main memory to stripe data across the plurality of memory modules such that each stripe comprises a plurality of blocks of data and at least one block of parity information, each of the plurality of blocks of data and the at least one block of parity information adapted to be stored in a respective one of the plurality of memory modules.

10. The memory system, as set forth in claim 8, wherein the plurality of memory modules are removable.

11. The memory system, as set forth in claim 7, wherein the XOR engine is adapted to retrieve a plurality of blocks of data and at least one block of parity information from the semiconductor main memory and to correct corrupted data in one of the plurality of blocks of data by XORing the other plurality of blocks of data and the at least one block of parity information.

12. The memory system, as set forth in claim 7, wherein the XOR engine is adapted to restore the corrected data to the semiconductor main memory.

13. A computer system comprising:
    a semiconductor main memory adapted to store data;
    a processor adapted to request that the data be stored in the semiconductor main memory and read from the semiconductor main memory;
    a memory controller configured to directly access the semiconductor main memory in response to interaction with the processor;
    secondary non-volatile memory indirectly accessible by the memory controller through a peripheral device bus;
    wherein the memory controller is operably coupled to the semiconductor main memory and is adapted to configure the semiconductor main memory as a fault tolerant memory array;
    wherein the memory controller is adapted to utilize error correction code to detect corrupted data retrieved by the memory controller from the semiconductor main memory; and
    wherein the memory controller is further adapted to correct the corrupted data by XORing the corrupted data to directly generate correct data.

14. The computer system, as set forth in claim 13, wherein the semiconductor main memory comprises a plurality of memory modules.

15. The computer system, as set forth in claim 14, wherein the memory controller is adapted to configure the semiconductor main memory to stripe data across the plurality of memory modules such that each stripe comprises a plurality of blocks of data and at least one block of parity information, each of the plurality of blocks of data and the at least one block of parity information adapted to be stored in a respective one of the plurality of memory modules.

16. The computer system, as set forth in claim 14, wherein the plurality of memory modules are removable.

17. The computer system, as set forth in claim 13, wherein the XOR engine is adapted to retrieve a plurality of blocks of data and at least one block of parity information from the semiconductor main memory and to correct corrupted data in one of the plurality of blocks of data by XORing the other plurality of blocks of data and the at least one block of parity information.

18. The computer system, as set forth in claim 13, wherein the XOR engine is adapted to restore the corrected data to the semiconductor main memory.

19. A memory controller adapted to configure a semiconductor main memory as a fault tolerant memory array in which data is stored in stripes, each of the stripes comprising a plurality of blocks of data and at least one block of parity information, the memory controller comprising:
    a memory bus interface adapted to be coupled to the semiconductor main memory for direct access to the semiconductor main memory;
    a local bus interface adapted to be coupled to a central processing unit;
    wherein each of the plurality of blocks of data and the at least one block of parity information are stored in respective segments of the semiconductor main memory;
    wherein the memory controller is adapted to utilize error correction code to detect corrupted data in a stripe retrieved by the memory controller from the semiconductor main memory; and
    wherein the memory controller is further adapted to correct the corrupted data in the stripe by XORing the data stored in the other stripes to generate correct data in the corrupted stripe.

20. The memory controller, as set forth in claim 19, wherein the semiconductor main memory comprises a plurality of memory modules.

21. The memory controller, as set forth in claim 20, wherein the memory controller is adapted to configure the semiconductor main memory to stripe data across the plurality of memory modules such that each of the plurality of blocks of data and the at least one block of parity information are adapted to be stored in a respective one of the plurality of memory modules.

22. The memory controller, as set forth in claim 19, wherein the plurality of memory modules are removable.

23. The memory controller, as set forth in claim 19, wherein the XOR engine is adapted to retrieve a plurality of blocks of data and at least one block of parity information from the semiconductor main memory and to correct corrupted data in one of the plurality of blocks of data by XORing the other plurality of blocks of data and the at least one block of parity information.

24. The memory controller, as set forth in claim 19, wherein the XOR engine is adapted to restore the corrected data to the semiconductor main memory.

25. A memory system comprising:
    a semiconductor main memory;
    a memory controller adapted to be used as a bridge between at least one processor and the semiconductor main memory;
    wherein the memory controller is adapted to be operably coupled to the semiconductor main memory for direct access to the semiconductor main memory;
    wherein the memory controller is adapted to configure the semiconductor main memory as a fault tolerant memory array in which data is stored in stripes, each of the stripes comprising a plurality of blocks of data and at least one block of parity information;
    wherein each of the plurality of blocks of data and the at least one block of parity information are stored in respective segments of the semiconductor main memory;
    wherein the memory controller is adapted to utilize error correction code to detect corrupted data in a stripe retrieved by the memory controller from the semiconductor main memory; and
    wherein the memory controller is further adapted to correct the corrupted data in the stripe by XORing the data stored in the other stripes to generate correct data in the corrupted stripe.

26. The memory system, as set forth in claim 25, wherein the semiconductor main memory comprises a plurality of memory modules.

27. The memory system, as set forth in claim 26, wherein the memory controller is adapted to configure the semiconductor main memory to stripe data across the plurality of memory modules such that each of the plurality of blocks of data and the at least one block of parity information are adapted to be stored in a respective one of the plurality of memory modules.

28. The memory system, as set forth in claim 26, wherein the plurality of memory modules are removable.

29. The memory system, as set forth in claim 25, wherein the XOR engine is adapted to retrieve a plurality of blocks of data and at least one block of parity information from the semiconductor main memory and to correct corrupted data in one of the plurality of blocks of data by XORing the other plurality of blocks of data and the at least one block of parity information.

30. The memory system, as set forth in claim 25, wherein the XOR engine is adapted to restore the corrected data to the semiconductor main memory.

31. A computer system comprising:
a semiconductor main memory adapted to store data;
a processor adapted to request that the data be stored in the semiconductor main memory and read from the semiconductor main memory;
a memory controller configured to directly access the semiconductor main memory in response to interaction with the processor;
secondary non-volatile memory indirectly accessible by the memory controller through a peripheral device bus;
wherein the memory controller is adapted to configure the semiconductor main memory as a fault tolerant memory array in which data is stored in stripes, each of the stripes comprising a plurality of blocks of data and at least one block of parity information;
wherein each of the plurality of blocks of data and the at least one block of parity information are stored in respective segments of the semiconductor main memory;
wherein the memory controller is adapted to utilize error correction code to detect corrupted data in a stripe retrieved by the memory controller from the semiconductor main memory; and
wherein the memory controller is further adapted to correct the corrupted data in the stripe by XORing the data stored in the other stripes to generate correct data in the corrupted stripe.

32. The computer system, as set forth in claim 31, wherein the semiconductor main memory comprises a plurality of memory modules.

33. The computer system, as set forth in claim 32, wherein the memory controller is adapted to configure the semiconductor main memory to stripe data across the plurality of memory modules such that each of the plurality of blocks of data and the at least one block of parity information are adapted to be stored in a respective one of the plurality of memory modules.

34. The computer system, as set forth in claim 32, wherein the plurality of memory modules are removable.

35. The computer system, as set forth in claim 31, wherein the XOR engine is adapted to retrieve a plurality of blocks of data and at least one block of parity information from the semiconductor main memory and to correct corrupted data in one of the plurality of blocks of data by XORing the other plurality of blocks of data and the at least one block of parity information.

36. The computer system, as set forth in claim 31, wherein the XOR engine is adapted to restore the corrected data to the semiconductor main memory.

* * * * *